Oct. 21, 1930. J. B. RICE ET AL 1,778,774
FEEDER FOR PULVERIZED FUEL AND THE LIKE
Filed Feb. 4, 1928 5 Sheets-Sheet 2

INVENTORS
Julian Brewster Rice &
Theodore Kruger
BY
Symmestvedt & Lechner
ATTORNEYS Oct. 21, 1930. J. B. RICE ET AL 1,778,774
FEEDER FOR PULVERIZED FUEL AND THE LIKE
Filed Feb. 4, 1928 5 Sheets-Sheet 3

INVENTORS
Julian Brewster Rice &
Theodore Kruger
BY
Lymestvedt & Lechner
ATTORNEYS Oct. 21, 1930.    J. B. RICE ET AL    1,778,774
FEEDER FOR PULVERIZED FUEL AND THE LIKE
Filed Feb. 4, 1928    5 Sheets-Sheet 4

INVENTORS
Julian Brewster Rice +
Theodore Kruger
BY
Synnestvedt & Lechner
ATTORNEYS

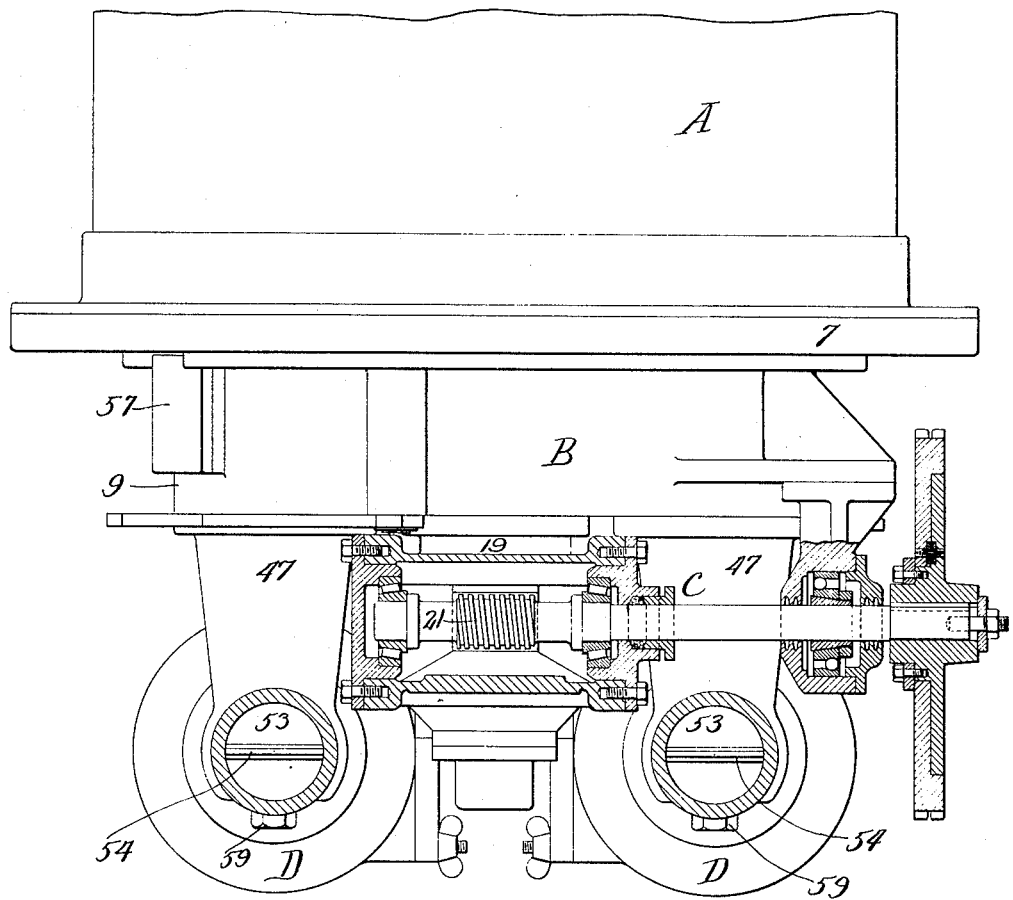

Patented Oct. 21, 1930

1,778,774

UNITED STATES PATENT OFFICE

JULIAN BREWSTER RICE, OF NEW ROCHELLE, NEW YORK, AND THEODORE KRUGER, OF PEORIA, ILLINOIS, ASSIGNORS TO INTERNATIONAL COMBUSTION ENGINEERING CORPORATION, OF NEW YORK, N. Y., A CORPORATION OF DELAWARE

FEEDER FOR PULVERIZED FUEL AND THE LIKE

Application filed February 4, 1928. Serial No. 251,979.

This invention relates to feeders for feeding pulverized fuel and the like.

One of the primary objects of our invention is the provision of a feeder in which flooding and puffing difficulties are overcome with the result that a feeder having uniform flow of material is provided.

Another object resides in preventing "hanging" or stoppage of flow resulting from the coal being somewhat moist, or for other reasons.

Still another object of our invention is to provide a feeder in which parts subject to wear may be readily replaced in an inexpensive manner.

A further object of our invention is the provision of a feeder in which certain of the parts have freedom of movement with respect to their associated parts so that binding difficulties usually occurring in apparatus of this class are overcome.

How the foregoing, together with such other objects and advantages as may hereinafter appear, or are incident to our invention, are realized is illustrated in preferred form in the accompanying drawings, wherein—

Fig. 5 is a part elevational and part sectional view, the section being taken on the line 5—5 of Fig. 4.

Figure 1:
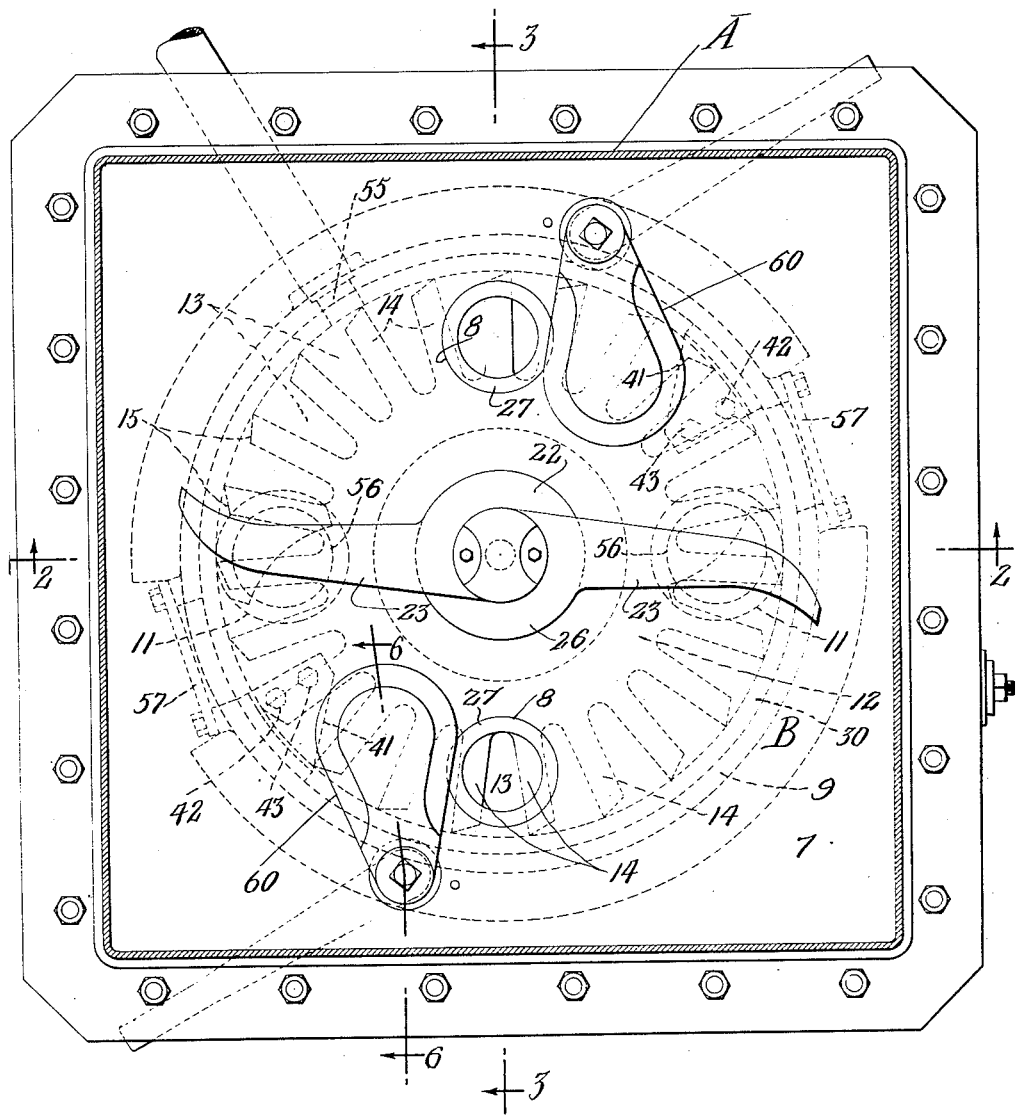
Fig. 1 is a plan view of a feeder embodying our improvements, the hopper or bin portion of which is shown in section.
Figure 2:
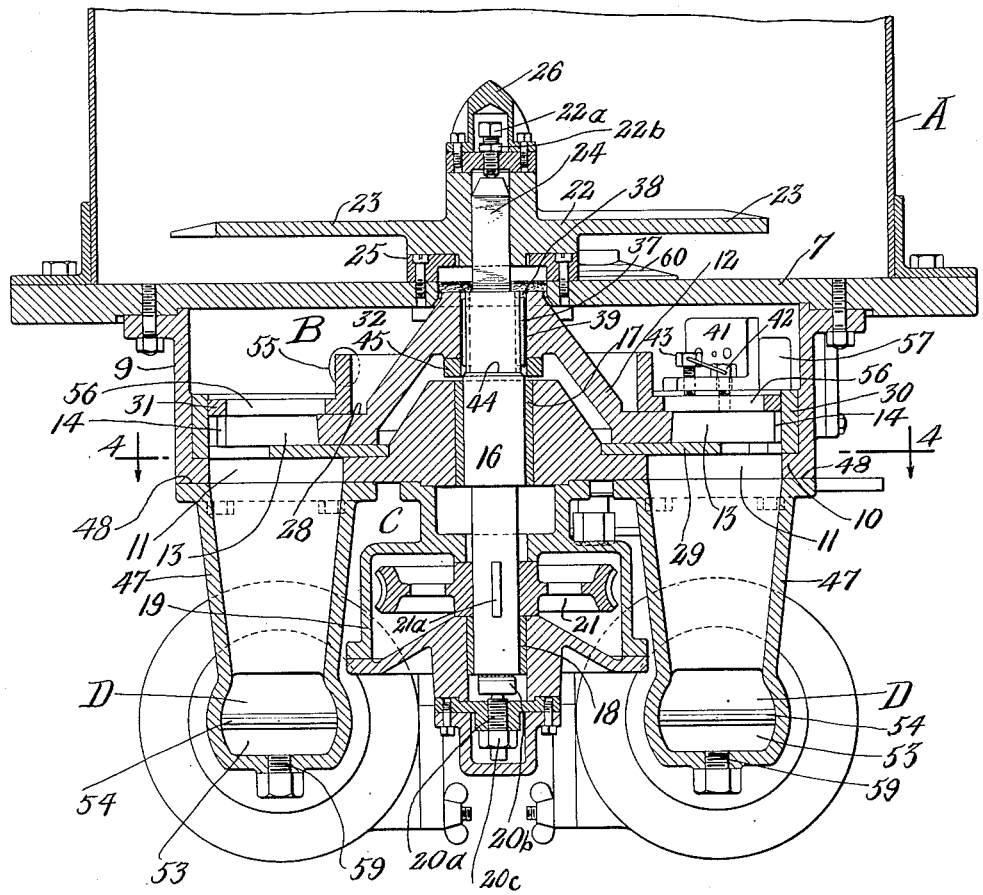
Fig. 2 is a vertical section through the feeder taken substantially on the line 2—2 of Fig. 1.
Figure 3:
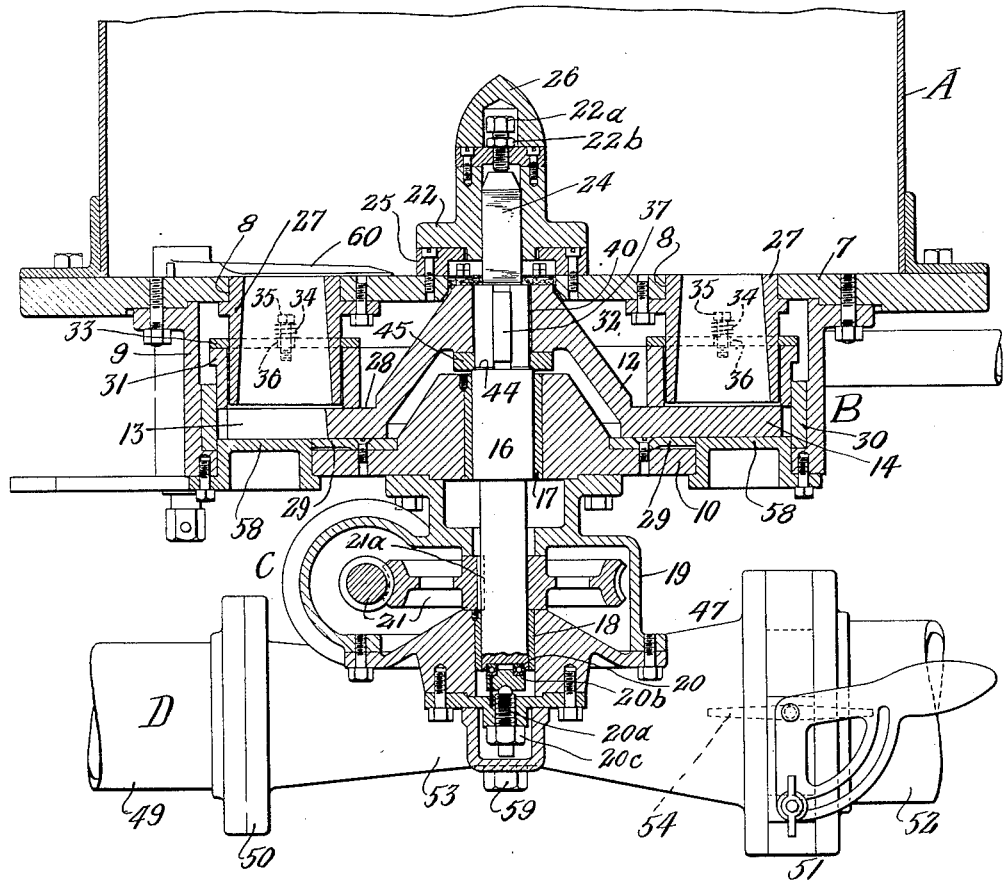
Fig. 3 is a vertical section taken at right angles to Fig. 2 and substantially on the line 3—3 of Fig. 1.
Figure 4:
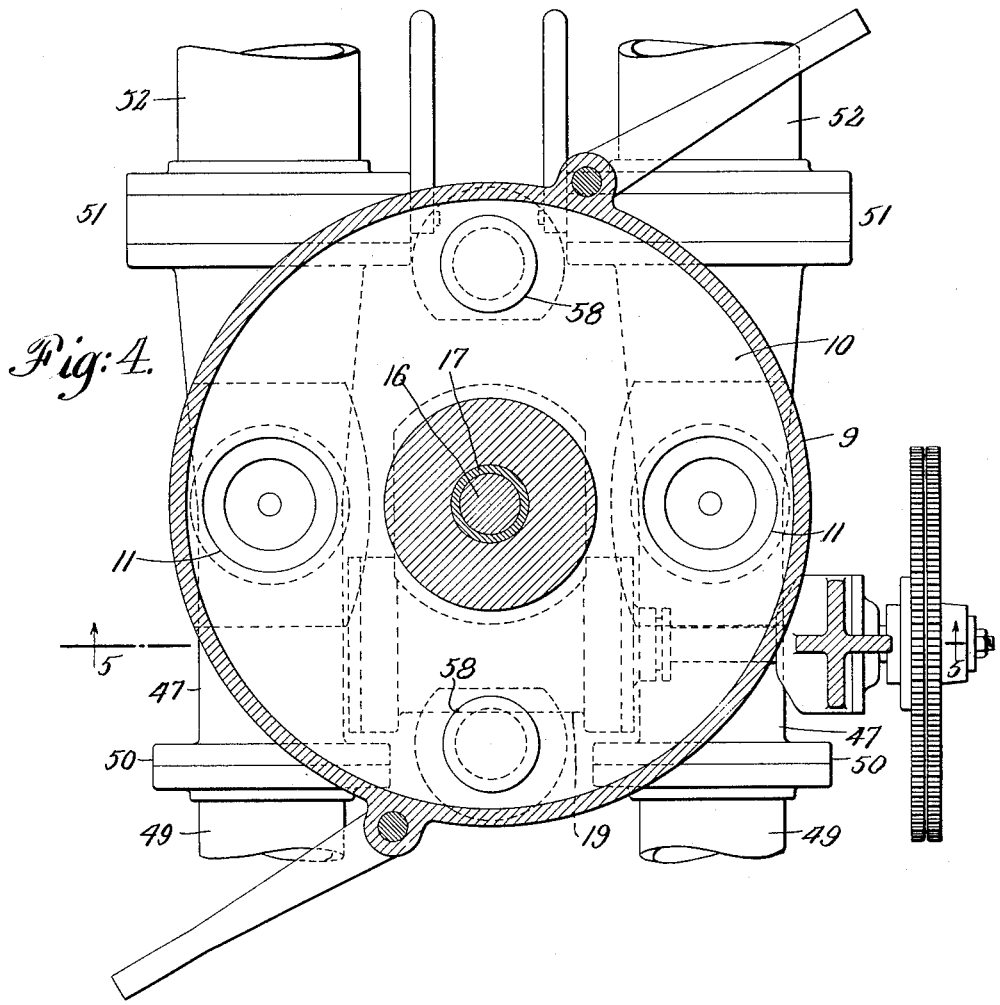
Fig. 4 is a horizontal section taken on the line 4—4 of Fig. 2.
Figure 6:
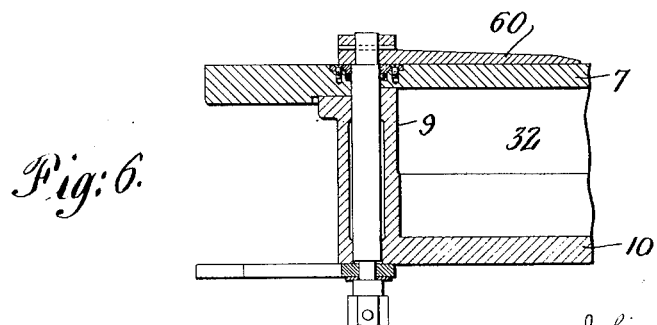
Fig. 6 is a detailed section taken on the line 6—6 of Fig. 1.

Referring to the drawings, and particularly to Figs. 1, 2 and 3, the device comprises in general a hopper or bin A, feeder mechanism B, drive means C for the feeder mechanism, and delivery air lines D.

The bin or hopper is provided with a bottom 7 having apertures 8 through which material flows to the feeder mechanism, in this instance two such apertures being shown. A casing or throat 9 extends downwardly from the hopper bottom 7 and is provided with a bottom 10 having apertures 11 through which material advanced by the feeder mechanism is discharged into the delivery lines D. Two such apertures are shown and they are located out of alignment or registry with the apertures 8, as is clearly indicated in Fig. 1, i. e., the apertures 11 do not lie beneath the apertures 8. Thus, "run" of material through the feeder is prevented.

From the foregoing it will be seen that the hopper A in one sense may be said to have two apertured bottoms spaced apart with the apertures in one bottom out of alignment with the apertures in the other bottom.

A rotatable feed wheel 12 is located between the bottoms 7 and 10 and within the casing or throat 9, which feed wheel is provided with a plurality of pockets 13 formed by a plurality of radial spokes or fingers 14, the ends of which are tapered as indicated at 15 in Fig. 1. Material from the bin is received by the pockets 13 and is advanced upon rotation of the feed wheel.

The feed wheel 12 is mounted on a drive shaft 16 to rotate therewith. The particular manner of mounting the wheel on the shaft will be described later in connection with certain advantageous features of our invention. The shaft has a self lubricated bearing 17 in the casing bottom 10 and a lubricated bearing 18 in a gear housing 19 attached to the bottom 10. A thrust bearing 20 supported from the gear housing through the medium of a set screw $20^a$ and thrust collar $20^b$ is also provided for the shaft 16. The gear housing 19 houses drive gearing 21 for the shaft, in this instance, the gearing being of the worm type, the worm wheel of which is splined at $21^a$ on the drive shaft 16 for a purpose hereinafter appearing.

Mounted at the upper end of the shaft 16 and above the bottom 7 is an agitator member 22 for preventing arching of material in the bin, which member comprises a hub portion and arms 23. This member rotates with the shaft by virtue of the squared connection at 24, which connection is in the nature of a spline. A set screw $22^a$ carried by the agitator 22 is provided for adjustably supporting the agitator on the shaft free from or in proper running clearance with a thrust collar 25 as desired. A lock nut 22$^b$ is provided for locking the set screw 22$^a$ in its adjusted position. A cap 26 is provided to prevent fine material from working into the shaft.

Reverting now to the feeder mechanism B and associated parts, it will be seen that each of the apertures 8 in the bottom 7 has associated therewith a downwardly extending neck or coal inlet bushing 27 having its inner surface tapering outwardly toward the bottom, which necks extend to a point slightly above the upper surface 28 of the pocketed portion of the feed wheel 12. It is to be observed that the feed wheel is so located and of such dimension that its upper surface 28 is spaced a substantial distance below the hopper bottom 7 and that its lower surface rides on the top surface of the bottom 10, which bottom is preferably provided with a renewable wear plate or member 29. This wear plate 29 is provided with an upstanding annular flange 30, the inner diameter of which is such with respect to the outer diameter of the feed wheel that a running fit is provided.

Associated with the necks 27 and with the feed wheel and annular flange 30 is a plate-like member 31, the bottom surface of which contacts with the top surface 28 of the feed wheel, and the peripheral surface of which contacts with the inner surface of the flange 30. This member 31, is provided with holes for receiving the necks 27, which holes may be slightly larger in diameter than the necks to avoid the necessity for extreme accuracy in machining. In order, however, to prevent material from working up through the space between the necks and the plate 31 and into the chamber 32 provided by the throat 9, a seal ring 33 is provided which snugly fits the neck and is held down against the plate 31 by means of springs 34 bearing at one end in the heads of studs 35 and at the other end on the seal ring. Clearance holes 36 for the studs 35 are provided in the seal ring which permit the ring to have freedom of movement in finding its proper position relative to the plate 31.

Reverting now to the manner of mounting the feed wheel on the drive shaft, it is pointed out that the connection between the two is a flexible one which, while causing the wheel to rotate with the shaft gives it freedom of axial movement with respect to the shaft as well as freedom of some angular movement with respect to the shaft. The particular connection illustrated comprises a pair of keys 37 carried by the shaft fitting key slots or grooves 38 in the feed wheel hub. Clearance is provided at 39 between the keys and key slots and also between the shaft and the shaft hole in the feed wheel hub, as indicated at 40. It will thus be seen that while the keys or splines cause the wheel to rotate with the shaft, yet the wheel has flexibility of movement with respect to the shaft, both axially and angularly. By this arrangement the feed wheel may seat and ride on the bottom 10.

In order to prevent flooding or run in a feeder handling material such as pulverized coal, it is important not only to have the apertures above referred to out of registry, but it is also important to prevent material from chasing past the feed wheel to the discharge outlet faster than the wheel is calculated to deliver it. For example, in a feeder of the general class described, if no provision were made to the contrary, material might work through the space between the wheel and the bottom 10 or between the neck and the feed wheel into the chamber in which the wheel is located and then pass to and out through the discharge openings. Thus, the feeder would be feeding more material than that calculated to be fed by the feed wheel which is known as "flooding" or "run" of the feeder.

Flow of material between the feed wheel and the bottom 10 is prevented by reason of the fact that the feed wheel seats and rides on the bottom. Flow of material between the feed wheel and the necks is prevented by providing the plate-like member 31 which provides a seal for the joint between the feed wheel and the upper bottom 7, in this instance the seal being at the joint between the necks and the feed wheel. The member 31 may be adapted to maintain this seal by resting on the wheel of its own weight, in which case it is free to move on the necks as guides. On the other hand, this member may be adjustably mounted by means of suitable brackets 41 and adjusting screws 42 (see Fig. 2), the brackets being secured to the throat 9. When adjusting the seal member 31, the adjusting screws are manipulated to bring the member 31 into proper contact with the upper surface of the wheel, after which it may be locked in its adjusted position by means of the locking screws 43. In the event of wear the plate 31 is readjusted to again obtain an effective seal. Flooding or run of material is prevented at the periphery of the wheel by means of the flange 30 above referred to.

It will thus be seen that the material is confined to flow from the bin or hopper into the necks 27, from the necks to the pockets of the feed wheel and from the pockets into the air lines D through the openings 11 in the bottom 10 as the pockets are brought over these openings.

By providing the flexible connection between the drive shaft and the feed wheel above referred to, extreme accuracy need not be exercised in machining the upper surface of the bottom 10 or its lining for the reason that the feed wheel will ride properly on such surface, even should the plane thereof be inaccurately located. It is evident that extreme accuracy would be required in machining this surface if the wheel were rigidly fixed on the shaft. The freedom of movement axially of the shaft permits relative expansion and contraction between the shaft and wheel without binding either on the bottom 10 or on the seal member 31. In the drawings we have shown a rounded shoulder 44 on the shaft 16 on which the feed wheel normally rests through the medium of a collar 45, as will hereinafter appear.

By means of the set screw 20ᵃ the shaft may be adjusted and located so that the shoulder 44 supports the feed wheel 12 in the desired position when shaft expansion due to temperature is normal for the operating temperature. The adjustment is preferably such that the lower surface of the feed wheel will normally ride, so to speak, on the hopper bottom 10, although its weight will be carried by the shaft 16. A lock nut 20ᶜ is provided for locking the set screw 20ᵃ in its adjusted position.

The adjustment of the agitator 22 is such that under normal conditions the agitator will similarly ride on the thrust collar 25 with the weight being taken by the shaft.

From the foregoing it will be apparent that in a feeder in which heat is employed the effects of temperature changes on the parts, i. e., expansion and contraction, will not cause objectionable binding, the binding difficulties at the feed wheel and agitator being taken care of by reason of the freedom of movement of these parts with respect to the shaft and at the worm wheel by the spline connection 21ᵃ.

In connection with the renewable lining plate 29 it is to be noted that the apertures therein which register with the apertures 11 in the bottom 10 are substantially semi-circular, the diagonal edges being so disposed as to be at an angle to the spokes 14 as they pass over the openings whereby a gradual discharge through the openings is obtained, with the result that pulsations are minimized and more uniform feed ensured, see Fig. 1.

The delivery lines D each comprise a fitting 47 associated with the discharge openings 11, the fittings in this instance being of T form and being secured to the hopper bottom at 48 and to a pipe line 49 at 50, which pipe line may lead to any desired point, as, for example, to the burners of a pulverized fuel burning furnace when the device is to be used as a feeder for pulverized fuel burning installations. At the portion 51 of the T the fitting is secured to an air line 52 leading from any suitable source of pressure air supply. The air so introduced serves to transport the material from the fitting through the pipe line 49. The fitting 47 preferably includes a Venturi portion 53 as illustrated in Figs. 2 and 3. In order to regulate the amount of air to be introduced into the line, we have provided adjustable dampers 54.

In addition to the air admitted by means of the air line 52, we have provided an air inlet or inlets 55 for introducing air into the chamber 32 provided by the throat 9, which air is preferably at a higher pressure than the pressure of the air in the air lines D. This air serves to prevent failure of feed for the reason that it blows the material out of the feed wheel pockets into the delivery lines and thus facilitates the flow. The fingers are thus kept clean, even if the coal be somewhat moist. The seal plate 31 is provided with apertures 56 aligned with the discharge apertures 11 in the bottom 10 through which the air passes to the pockets as described.

It is to be understood that the difference in pressure of the air in the chamber 32 and in the air lines D may be brought about in various ways, for example, air may be led to the chamber 32 from a source of higher air pressure than the source for the air line D, or the air might be taken from the air pipe 52 and the pressure in the line D lowered, as by means of the valve 54, or the Venturi action might be depended on to create a lower pressure below the feed wheel than in the chamber 32.

If desired the air introduced into the chamber 32 may be preheated so as to have a drying effect on the material.

In order to be enabled to remove foreign matter from the feeder in a convenient manner, we have provided covered hand-holes 57 in the throat 9 above the discharge openings 11 and covered hand-holes 58 in the bottom 10 below the inlet openings or necks 27. Plugged poke holes 59 are provided in the T fittings 47.

In the event that it is desired to operate the feeder with feed taking place through only one of the lines D, the valve 60 controlling the inlet to the other line is closed as is the air valve 54 of such line.

Reverting to the necks 27, it is pointed out that a body of coal is maintained therein ready to be advanced by the feed wheel without interruption of continuous feed; the capacity of the necks being sufficient to fill successively the spaces between feed wheel teeth during intervals between passages of the agitator arms over the respective necks.

No blow back difficulties are encountered as the air admitted into the chamber 32 follows the path of least resistance which is into the feed line.

We claim:—

1. In a feeder for pulverized coal and the like, the combination of a hopper having a pair of spaced apertured bottoms the apertures of one bottom being out of alignment with the apertures of the other bottom, a rotatable feed wheel located between said bottoms for feeding material from the apertures in one bottom to the apertures in the other bottom, a lining for one of said bottoms on which the wheel rides, said lining having apertures corresponding to the apertures in its bottom, necks for confining the flow of material from the apertures in the other bottom to the feed wheel, and means associated with said necks and the feed wheel for preventing flooding of the feeder.

2. In a feeder for pulverized coal and the like, the combination of a hopper having a pair of spaced apertured bottoms the apertures of one bottom being out of alignment with the apertures of the other bottom, a rotatable feed wheel located between said bottoms for feeding material from the apertures in one bottom to the apertures in the other bottom, a lining for one of said bottoms on which the wheel rides, said lining having apertures corresponding to the apertures in its bottom, necks for confining the flow of material from the apertures in the other bottom to the feed wheel, and means associated with said necks and the feed wheel for preventing flooding of the feeder, said means being movable to take up wear.

3. In a feeder for pulverized coal and the like, the combination of a hopper having a pair of spaced apertured bottoms the apertures of one bottom being out of alignment with the apertures of the other bottom, a rotatable feed wheel located between said bottoms for feeding material from the apertures in one bottom to the apertures in the other bottom, a lining for one of said bottoms on which the wheel rides, said lining having apertures corresponding to the apertures in its bottom, necks for confining the flow of material from the apertures in the other bottom to the feed wheel, and means associated with said necks and the feed wheel for preventing flooding of the feeder, said means being adjustable, together with means for locking the aforesaid means in its adjusted position.

4. In a feeder for pulverized coal and the like, the combination of a hopper having a pair of spaced apertured bottoms, the apertures of one bottom being out of alignment with the apertures of the other bottom, a rotatable feed wheel for feeding material from the apertures in one bottom to the apertures in the other bottom, a lining for one of the bottoms on which the wheel rides, said lining having an annular flanged portion surrounding and engaging the periphery of said wheel, neck members for the apertures in the other bottom through which the material flows in its passage from the hopper to the feed wheel, and means associated with said necks, the feed wheel, and the aforesaid lining to maintain a seal against leakage of material past the joints of said parts.

5. In a feeder for pulverized coal and the like, the combination of a hopper having an apertured bottom, a throat extending downwardly from said bottom and having an apertured bottom, the aperture of which is out of alignment with the aperture in the hopper bottom, a rotatable shaft, a feed wheel flexibly mounted on said shaft for rotation thereby, said wheel being located to ride on the throat bottom and being spaced from the hopper bottom, a neck associated with the aperture in the hopper bottom and extending downwardly therefrom to close proximity with the feed wheel, a member for providing a seal at the joint between the neck and the feed wheel, said feed wheel being adapted to feed material received from said neck to the aperture in the throat bottom, an air line associated with the aperture in the throat bottom into which the material is discharged, and means for admitting air into the interior of the throat at a pressure higher than the pressure of the air in the aforesaid air line.

6. In combination with a bin, a feeder comprising two spaced apertured plates, an enclosed chamber between said plates, a rotatable pocketed plate within said chamber for advancing material from the bin, an air line into which the material is discharged, means for admitting pressure air into said enclosed chamber, said rotatable pocketed plate being mounted to ride on one of the apertured plates, and means associated with the other plate and the rotatable plate for providing a seal for the joint therebetween, said means being apertured correspondingly to said other plate.

7. In combination with a bin, a feeder comprising two spaced apertured plates, the apertures in one plate being out of line with the apertures of the other plate, an enclosed chamber between said plates, a rotatable pocketed wheel within said chamber located adjacent one of said plates and spaced from the other, necks for the apertures in said last mentioned plate adapted to receive material from the bin, said necks extending from the plate to the pocketed wheel, said wheel being adapted to advance material from the necks to the apertures in the other plate, a seal plate having apertures for receiving said necks and providing a seal between the wheel and the necks, said seal plate having other apertures aligned with the apertures in the plate adjacent which the wheel is located, and means for admitting pressure air into the aforesaid enclosed chamber.

8. In combination with a bin, a feeder comprising two spaced apertured plates, the apertures in one plate being out of line with the apertures of the other plate, an enclosed chamber between said plates, a rotatable pocketed wheel within said chamber located adjacent one of said plates and spaced from the other, necks for the apertures in said last mentioned plate adapted to receive material from the bin, said necks extending from the plate to the pocketed wheel, said wheel being adapted to advance material from the necks to the apertures in the other plate, a seal plate having apertures for receiving said necks and providing a seal between the wheel and the necks, said seal plate having other apertures aligned with the apertures in the plate adjacent which the wheel is located, and means for admitting pressure air into the aforesaid enclosed chamber, together with air lines into which the material advanced by the feeder is discharged.

9. In combination with a bin, a feeder comprising two spaced apertured plates, the apertures in one plate being out of line with the apertures of the other plate, an enclosed chamber between said plates, a rotatable pocketed wheel within said chamber located adjacent one of said plates and spaced from the other, necks for the apertures in said last mentioned plate adapted to receive material from the bin, said necks extending from the plate to the pocketed wheel, said wheel being adapted to advance material from the necks to the apertures in the other plate, a seal plate having apertures for receiving said necks and providing a seal between the wheel and the necks, said seal plate having other apertures aligned with the apertures in the plate adjacent which the wheel is located, and means for admitting pressure air into the aforesaid enclosed chamber, together with air lines into which the material advanced by the feeder is discharged, the pressure of the air in the enclosed chamber being greater than that in the air lines.

10. In combination with a bin, a feeder comprising two spaced apertured plates, a feed wheel for advancing material from the bin, a delivery line into which the material advanced is discharged, means associated with the feed wheel to prevent flooding of the feeder, a rotatable shaft, a splined connection between the shaft and wheel having capacity to connect the two for rotation together yet permitting changes in axial relation as well as angular relation.

11. In a feeder for pulverized coal and the like, the combination of a hopper having a pair of apertured bottoms spaced substantially apart, the apertures in one bottom being out of alignment with the apertures in the other bottom, a rotatable shaft, a feed wheel for feeding material from the apertures in one bottom to the apertures in the other bottom, and a flexible drive connection between said shaft and said wheel, said feed wheel being located to ride on the bottom through which the material discharges.

In testimony whereof we have hereunto signed our names.

JULIAN BREWSTER RICE.
THEODORE KRUGER.